United States Patent
Hoshino et al.

(10) Patent No.: US 11,242,882 B2
(45) Date of Patent: Feb. 8, 2022

(54) STAKING BOLT

(71) Applicant: AOYAMA SEISAKUSHO CO., LTD., Niwa-Gun (JP)

(72) Inventors: Naoki Hoshino, Niwa-Gun (JP); Kazuhiro Koga, Niwa-Gun (JP); Yukinori Fujimoto, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 184 days.

(21) Appl. No.: 16/577,232

(22) Filed: Sep. 20, 2019

(65) Prior Publication Data

US 2020/0011365 A1 Jan. 9, 2020

Related U.S. Application Data

(63) Continuation of application No. PCT/JP2017/043502, filed on Dec. 4, 2017.

(30) Foreign Application Priority Data

May 30, 2017 (JP) ............................. JP2017-106171

(51) Int. Cl.
*F16B 35/04* (2006.01)
*F16B 37/06* (2006.01)
*F16B 39/282* (2006.01)

(52) U.S. Cl.
CPC .......... *F16B 35/048* (2013.01); *F16B 37/068* (2013.01); *F16B 39/282* (2013.01)

(58) Field of Classification Search
CPC .... F16B 37/069; F16B 35/048; F16B 39/282; F16B 37/068

(Continued)

(56) References Cited

U.S. PATENT DOCUMENTS 3,000,420 A * 9/1961 Spokes ................. F16B 37/068
411/180
3,127,919 A * 4/1964 Swanstrom ........... F16B 37/068
411/188

(Continued)

FOREIGN PATENT DOCUMENTS

CN 103382957 A 11/2013
EP 2 166 237 A1 3/2010

(Continued)

OTHER PUBLICATIONS

Extended European Search Report (Application No. 17911879.9) dated Mar. 18, 2020.

(Continued)

*Primary Examiner* — Flemming Saether
(74) *Attorney, Agent, or Firm* — Burr & Brown, PLLC

(57) ABSTRACT

The staking bolt of the present invention includes a head 10 and a shank 11 having an external thread 12. At the upper end of the shank 11, a ring-shaped protrusion 20 and a ring groove 21 located closer to the head relative to the ring-shaped protrusion 20 are formed. The head 10 is flat, and on the bearing face 13, a whirl-stop protrusion 14 having a plurality of radially extending arms 15 protrudes with a thickness of t. The minimum diameter D between respective arms 15 is larger than the outer diameter d of the ring-shaped protrusion 20, and t×(D−d)/2 which is the longitudinal cross-sectional area A of the minimum diameter portion of the whirl-stop protrusion 14 is equal to or greater than the longitudinal cross-sectional area of the ring groove 21.

1 Claim, 5 Drawing Sheets

(58) Field of Classification Search
USPC .................................................. 411/179, 180
See application file for complete search history.

(56) References Cited

U.S. PATENT DOCUMENTS

| | | | | |
|---|---|---|---|---|
| 3,137,336 A | * | 6/1964 | Wing | .................... F16B 41/002 |
| | | | | 411/135 |
| 3,770,037 A | * | 11/1973 | Ernest | ..................... F16B 35/06 |
| | | | | 411/184 |
| 3,967,669 A | | 7/1976 | Egner | |
| 4,637,766 A | | 1/1987 | Milliser | |
| 4,940,375 A | * | 7/1990 | Marvell | ................ B23P 19/062 |
| | | | | 29/432.2 |
| 5,797,175 A | | 8/1998 | Schneider | |
| 7,401,394 B1 | * | 7/2008 | Muller | .................. B23P 19/062 |
| | | | | 29/432.1 |
| 9,574,602 B2 | | 2/2017 | Burton | |
| 10,655,666 B2 | * | 5/2020 | Hoshino | ............... F16B 37/068 |
| 2003/0108400 A1 | | 6/2003 | Ross | |
| 2014/0003883 A1 | | 1/2014 | Osborn et al. | |
| 2016/0169263 A1 | | 6/2016 | Mori et al. | |
| 2019/0010973 A1 | * | 1/2019 | Hirschmann | ......... F16B 37/068 |

FOREIGN PATENT DOCUMENTS

| | | |
|---|---|---|
| JP | 2011-241905 A1 | 12/2011 |
| JP | 2013-244903 A1 | 12/2013 |
| WO | 2015/005347 A1 | 1/2015 |

OTHER PUBLICATIONS

International Search Report and Written Opinion (Application No. PCT/JP2017/043502) dated Feb. 6, 2018.

* cited by examiner

STAKING BOLT

CROSS REFERENCE TO RELATED APPLICATIONS

This application is a continuation of International Application No. PCT/JP2017/043502 filed Dec. 4, 2017, which designated the United States, and claims the benefit under 35 USC § 119(a)-(d) of Japanese Application No. 2017-106171 filed May 30, 2017, the entireties of which are incorporated herein by reference.

FIELD OF THE INVENTION

The present invention relates to a staking bolt that is caulked and fixed to a mating metal plate and used to fasten other members.

BACKGROUND OF THE INVENTION

The staking bolt is a bolt that is press-fit into the pilot hole of the mating metal plate using a tool and causes the metal material to plastically flow in the ring groove formed around the shank, thereby being caulked and fixed to the metal plate. A large extraction load (extraction load in the axial direction) is required of the staking bolt. Also, since another member is fastened to the staking bolt that has been caulked and fixed using a nut, it is desirable that the slip torque (the torque at which the staking bolt begins to slip with respect to the metal plate) be large, and as shown in Patent Literature 1, the bolt having a whirl-stop protrusion on the bearing face of the head is used.

The conventional staking bolt shown in Patent Literature 1 has, as shown in FIG. 1, a wave-form whirl-stop protrusion 3 on the bearing face 2 of a thick head 1 and a ring groove 4 continuously formed under the whirl-stop protrusion 3 to plastically flow a metal material. However, in such a conventional structure, it is not easy to completely fill the inside of the ring groove 4 with the metal material in the caulking process, and the slip torque after caulking is as low as 10 Nm or less. Moreover, since the conventional staking bolt shown in Patent Literature 1 has a large head 1, it can be caulked and fixed only to a thick metal plate 5. Furthermore, there is a problem that the conventional staking bolt shown in Patent Literature 1 cannot tighten a nut to the vicinity of the head 1 because the head 1 and the starting position of an external thread 6 of the shank are separated, and fastening with the nut cannot be implemented unless the total thickness of the metal plate 5 and the object to be fastened is sufficiently thick.

CITATION LIST

Patent Literature

Patent Literature 1: U.S. Pat. No. 3,967,669

SUMMARY OF INVENTION

Technical Problems

It is therefore an object of the present invention to solve the above-mentioned conventional problems and to provide a staking bolt capable of having a large extraction load and slip torque even when caulked onto a thin metal plate. Another object of the present invention is to provide a staking bolt which can be reliably fastened by a nut even when the total thickness of a metal plate and an object to be fastened is thinner than that in the prior art.

Solutions to Problems

According to the present invention, which has been made to solve the above problems, a staking bolt includes a head and a shank having an external thread, wherein a ring-shaped protrusion at an upper end of the shank and a ring groove located closer to the head relative to the ring-shaped protrusion are formed, wherein the head is flat and on a bearing face of the head, a whirl-stop protrusion having a plurality of radially extending arms protrudes with a thickness of t from the bearing face of the head, wherein a minimum diameter D between respective arms of the whirl-stop protrusion is larger than an outer diameter d of the ring-shaped protrusion, and wherein t×(D−d)/2 which is a longitudinal cross-sectional area A of a minimum diameter portion of the whirl-stop protrusion is equal to or greater than a longitudinal cross-sectional area of the ring groove.

In addition, it is preferable that the outer diameter d1 of the shank of the part between the ring-shaped protrusion and the external thread is equal to or less than a root diameter d2 of the external thread.

Advantageous Effects of Invention

In the staking bolt according to the present invention, the minimum diameter D between respective arms of the whirl-stop protrusion formed on the bearing face of the head is larger than the outer diameter d of the ring-shaped protrusion formed on the shank, and t×(D−d)/2, which is the longitudinal cross-sectional area A of the minimum diameter portion of the whirl-stop protrusion, is equal to or greater than the longitudinal cross-sectional area of the ring groove. For this reason, when caulked onto a metal plate, even in the minimum diameter portion of the whirl-stop protrusion, the metal material corresponding to the longitudinal cross-sectional area A can be plastically flown to completely fill the inside of the ring groove having the longitudinal cross-sectional area B. Further, since the ring-shaped protrusion formed on the bearing face of the flat head is pressed into the surface of the metal plate, even when caulked onto a thin metal plate, it is possible to obtain a slip torque larger than that of the conventional product.

When the outer diameter d1 of the portion between the ring-shaped protrusion and the external thread is equal to or less than the root diameter d2 of the external thread, the inner diameter of the nut is larger than the outer diameter d1. For this reason, a nut for fastening an object to be fastened to a shank of a staking bolt caulked onto a metal plate can be fastened to the position of a ring-shaped protrusion, so that strong fastening can be implemented even when the total thickness of the metal plate and the object to be fastened is thinner than that in the prior art.

DETAILED DESCRIPTION OF THE INVENTION

Hereinafter, the preferred embodiment of the present invention will be described.

Figure 1:
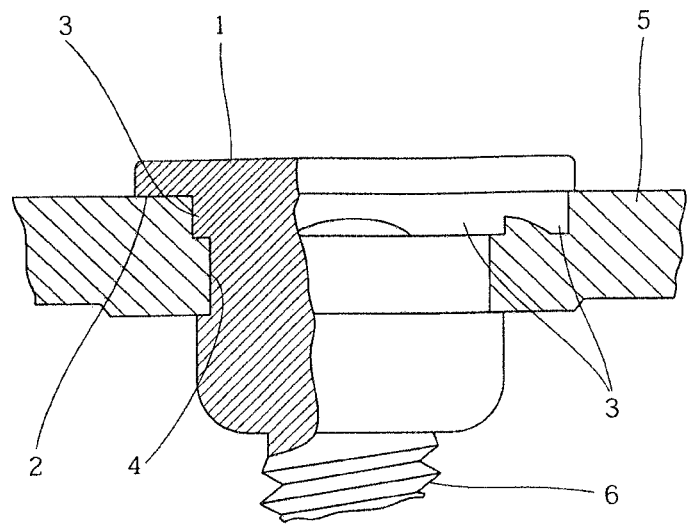
FIG. 1 is a partial cross-sectional view of the principal part of a conventional staking bolt.
Figure 2:
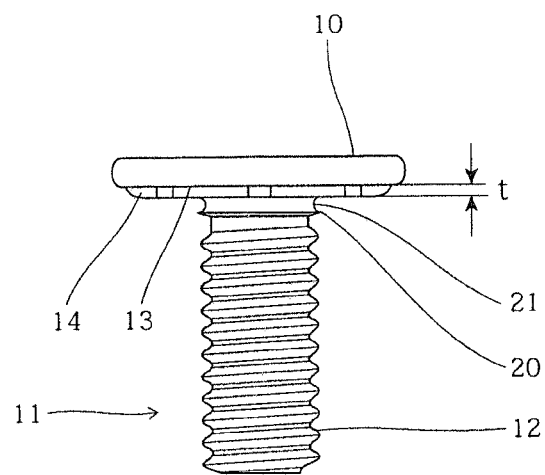
FIG. 2 is a front view of a staking bolt according to an embodiment of the present invention.
Figure 3:
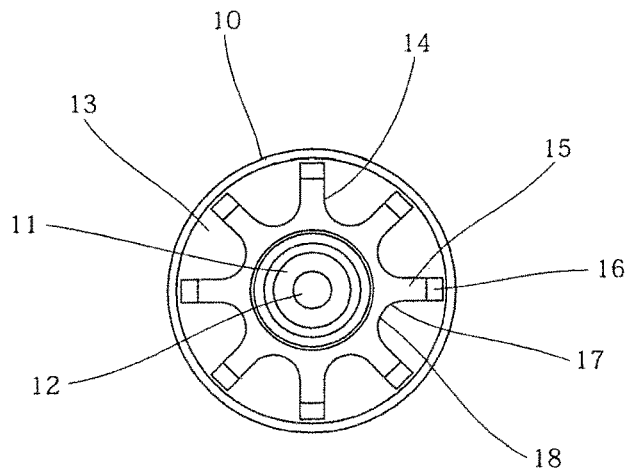
FIG. 3 is a bottom view of a staking bolt according to an embodiment of the present invention.

FIG. 2 is a front view of a staking bolt according to an embodiment of the present invention, and FIG. 3 is a bottom view thereof. As shown in these figures, the staking bolt of the present invention includes a head 10 and a shank 11, and an external thread 12 is formed on the shank 11. The head 10 has a flat shape.

On a bearing face 13 of the head 10, a whirl-stop protrusion 14 is provided so as to protrude from the bearing face 13 by a thickness of t. As described later, the staking bolt is caulked and fixed to the metal plate, and the bearing face 13 is a surface where the head 10 contacts the metal plate. It is preferable that t be ¼ to ½ of the thickness of the head 10.

Figure 4:
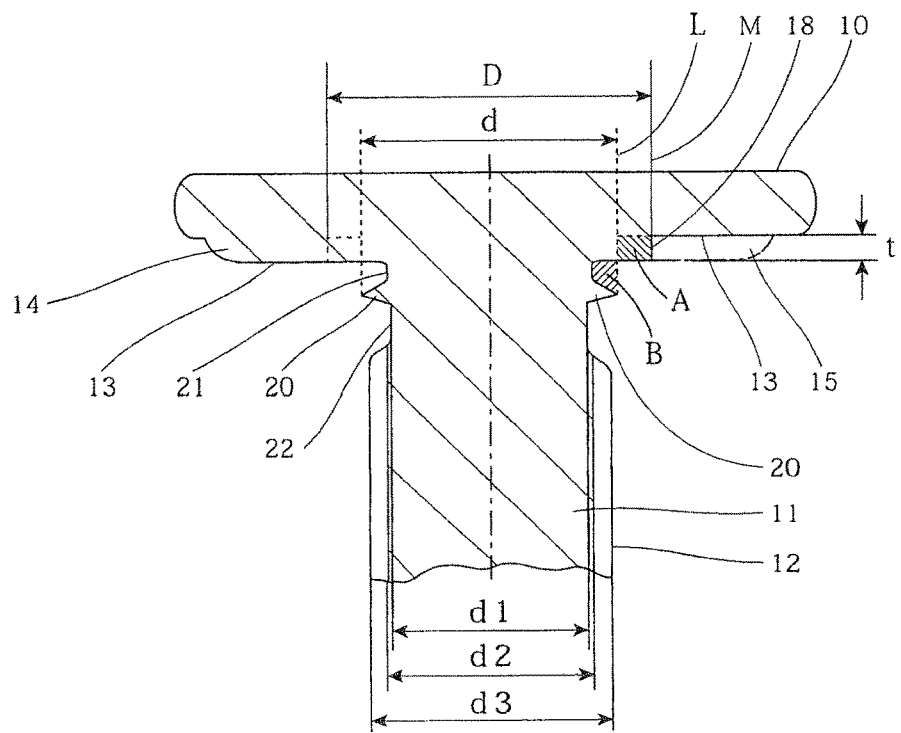
FIG. 4 is an enlarged cross-sectional view of a staking bolt according to an embodiment of the present invention.

The whirl-stop protrusion 14 is provided with a plurality of arms 15 extending radially from the center of the shank 11, as shown in FIG. 3. Although eight arms 15 are formed at equal intervals in this embodiment, the number of arms 15 is not limited to this, and can be increased or decreased as appropriate. Each of the arms 15 has a substantially constant width and extends to the vicinity of the outer circumference of the bearing face 13, and has a distal end with an inclined face 16. The base of each of the arms 15 is connected by an arc-shaped portion 17. As shown in FIG. 3, the position of a minimum diameter portion 18 of the arc-shaped portion 17 is at a position away from the shank 11. As shown in FIG. 4, the minimum diameter of the whirl-stop protrusion 14 which is the distance between the minimum diameter portions 18, 18 is represented by D.

As shown in FIG. 2, a ring-shaped protrusion 20 and a ring groove 21 adjacent to the head side of the ring-shaped protrusion 20 are formed at the upper end of the shank 11 over the entire circumference of the shank 11. As shown in FIG. 4, the outer diameter d of the ring-shaped protrusion 20 is slightly larger than a ridge diameter d3 of the external thread 12 formed on the shank 11. The upper part of the ring groove 21 is smoothly connected to the arm 15 of the bearing face 13 of the head 10. The lower part of the ring groove 21 is smoothly connected to the ring-shaped protrusion 20.

In the enlarged cross-sectional view of FIG. 4, when a line L parallel to the center line of the shank 11 is drawn from the tip of the ring-shaped protrusion 20, the inside of this line L is a longitudinal cross-sectional area B of the ring groove 21. In addition, the area of a rectangle surrounded by the line L, the bearing face 13 of the head 10, a vertical line M indicating the minimum diameter portion of the arc-shaped portion 17, and the line indicating the lower face of the whirl-stop protrusion 14 is a longitudinal cross-sectional area A of the minimum diameter portion 18 of the whirl-stop protrusion 14. Here, since the minimum diameter of the whirl-stop protrusion 14 is D, $A = t \times (D-d)/2$. In the present invention, $t \times (D-d)/2$, which is the longitudinal cross-sectional area A of the minimum diameter portion 18 of the whirl-stop protrusion 14 described above, is set equal to or greater than the longitudinal cross-sectional area B of the ring groove 21. The meaning of this will be described below.

A non-threaded portion 22 is formed between the upper end of the external thread 12 and the ring-shaped protrusion 20. In this embodiment, the outer diameter d1 of the shank of the non-threaded portion 22 is equal to or less than the root diameter d2 of the external thread.

Figure 5:
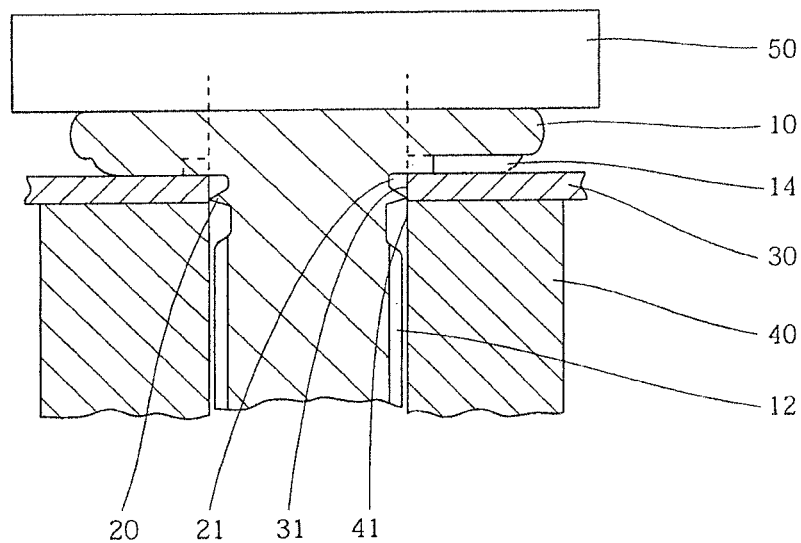
FIG. 5 is a cross-sectional view showing a state at the start of caulking.

The staking bolt configured as described above is inserted into a pilot hole 31 of a metal plate 30 as shown in FIG. 5 and caulked by a die 40 and a punch 50. As shown in FIG. 5, when the inner diameter of the pilot hole 31 is set slightly larger than the outer diameter d of the ring-shaped protrusion 20, the staking bolt is correctly centered on the pilot hole 31 due to the ring-shaped protrusion 20. As described above, since the outer diameter d of the ring-shaped protrusion 20 is slightly larger than the ridge diameter d3 of the external thread 12 formed on the shank 11, the external thread 12 is inserted into the pilot hole 31 without interference. A center hole 41 having substantially the same diameter as that of the pilot hole 31 is also formed in the die 40.

Figure 6:
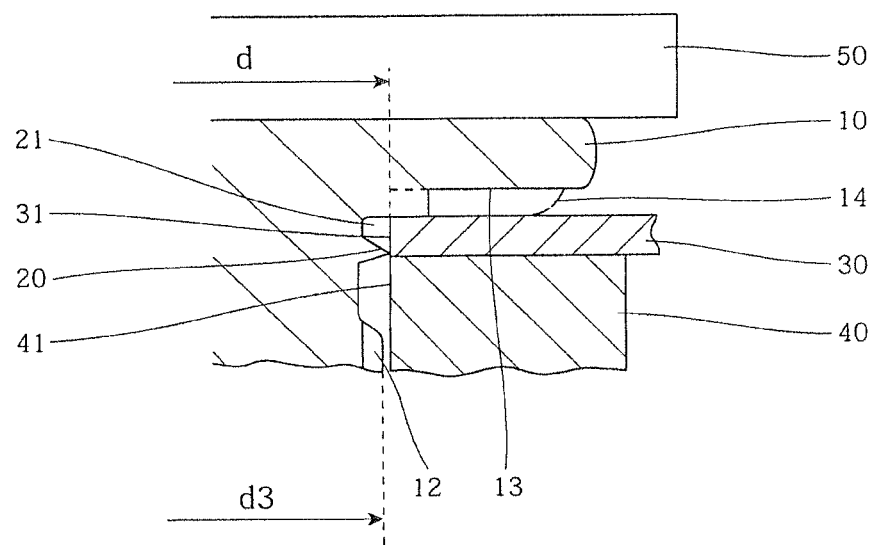
FIG. 6 is an enlarged cross-sectional view of the principal part showing a state at the start of caulking.

When the punch 50 is lowered toward the die 40, first, the lower face of the whirl-stop protrusion 14 of the head 10 of the staking bolt comes in contact with the upper face of the metal plate 30, as shown in FIGS. 5 and 6. When the punch 50 is further lowered, the whirl-stop protrusion 14 bites into the surface of the metal plate 30, and the bearing face 13 is in close contact with the surface of the metal plate 30 as shown in FIG. 8.

Figure 7:
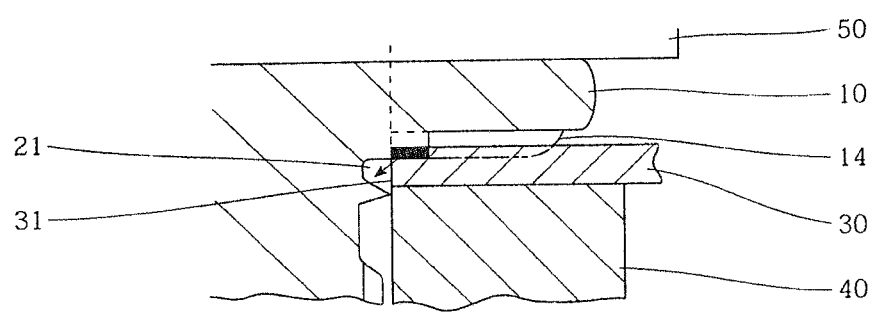
FIG. 7 is an enlarged cross-sectional view of the principal part showing the state in the middle of caulking.
Figure 8:
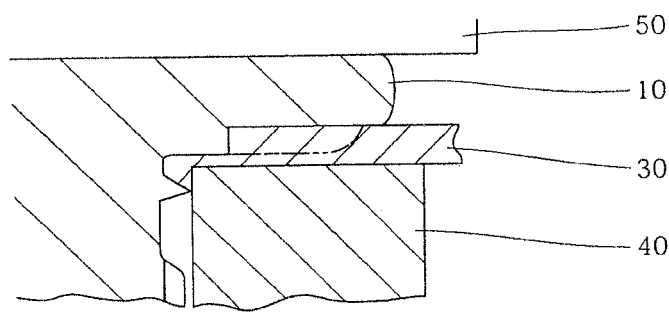
FIG. 8 is an enlarged cross-sectional view of the principal part showing the state at the time of completion of caulking.

During this caulking process, in the middle position of the arms 15 and 15, the portion shown in black in FIG. 7 bites into the outer circumference of the pilot hole 31 of the metal plate 30, the metal material of that portion flows into the inside of the ring groove 21 sequentially as shown by the arrow in FIG. 7, and finally, as shown in FIG. 8, the inside of the ring groove 21 is filled with the metal material. At this time, in the staking bolt according to the present invention, the longitudinal cross-sectional area A of the minimum diameter portion 18 of the whirl-stop protrusion 14 is set to be equal to or more than the longitudinal cross-sectional area B of the ring groove, so that a sufficient amount of the metal material can be plastically flown even in the vicinity of the minimum diameter portion 18, and the inside of the ring groove 21 can be reliably filled with the metal material.

Therefore, since the staking bolt of the present invention has a large extraction load after caulking and the whirl-stop protrusion 14 bites into the surface of the metal plate 30, a large slip torque can be obtained.

Figure 9:
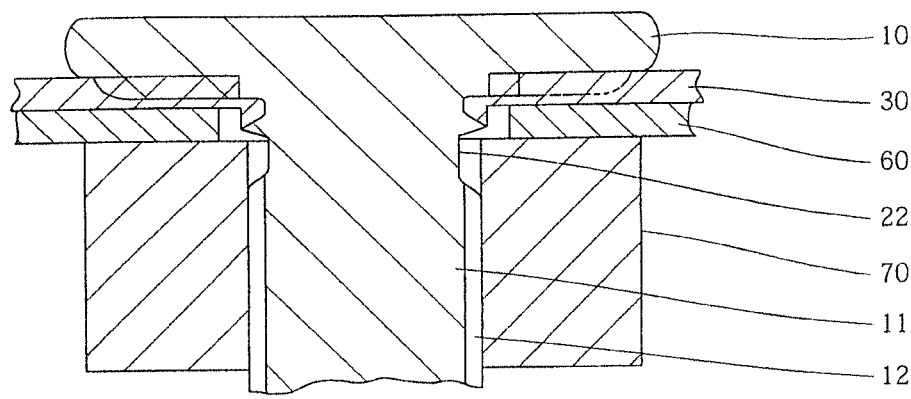
FIG. 9 is an enlarged cross-sectional view of the principal part showing the state in which an object to be fastened is fastened with a nut.

FIG. 9 indicates a state in which an object 60 to be fastened is fastened by a nut 70 to the staking bolt of the present invention, which is caulked and fixed to the metal plate 30. The inner diameter of the nut 70, which is the inner diameter of the internal thread of the nut 70, is approximately equal to the root diameter of the external thread 12 formed on the shank 11. As mentioned above, when the outer diameter d1 of the non-threaded portion 22 of the shank 11 is smaller than the root diameter d2 of the external thread, as shown in FIG. 9, the nut 70 can be screwed in sufficiently deeply without interference with the external thread of the shank 11, and even when the object 60 to be fastened is thin, secure fastening can be implemented. Further, since the head 10 of the staking bolt of the present invention is also flat, reliable fastening can be implemented even when the total thickness of the metal plate 30 and the object 60 to be fastened is thinner than that in the prior art.

Example

The staking bolt of the above-described embodiment was manufactured in M6 size. For the dimensions of each part, the thickness of the head is 1.5 mm, t=0.5 mm, D=7.6 mm, d=6.3 mm, d1=4.55 mm, d2=4.7 mm, d3=6.0 mm.

Figure 10:
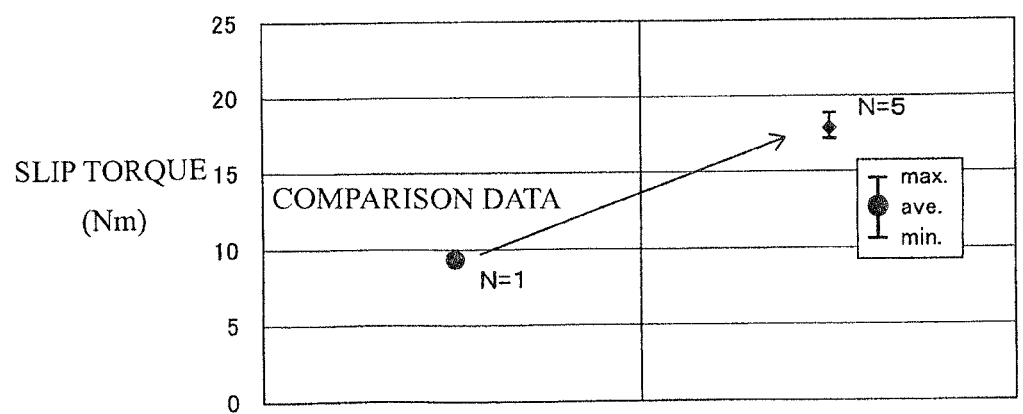
FIG. 10 is a graph of the slip torque in the example.

The staking bolt was inserted into the pilot hole having an inner diameter of 6.3 mm formed on a steel plate having a thickness of 1 mm, and was caulked and fixed using a die and a punch. Thereafter, when the slip torque was measured, as shown in the graph of FIG. 10, the average value of five bolts was 18 Nm.

This value was an excellently nearly twice as large as that of the slip torque of the conventional M6 size staking bolt shown as comparative data where the value was 10 Nm or less.

Moreover, fastening with the conventional M6 size staking bolt can not be implemented unless the total thickness of the metal plate and the object to be fastened is at least 3.2 mm, but secure fastening with the staking bolt having the shape of the embodiment can be implemented when the total thickness of the metal plate and the object to be fastened is 2 mm.

As described above, the staking bolt of the present invention can have a slip torque larger than that of conventional staking bolt even when a thin metal plate having a thickness of about 1 mm is caulked.

REFERENCE SIGNS LIST

1 head of conventional staking bolt
2 bearing face
3 whirl-stop protrusion
4 ring groove
5 metal plate
6 external thread
10 head of staking bolt of the embodiment
11 shank
12 external thread
13 bearing face
14 whirl-stop protrusion
15 arm
16 inclined surface
17 arc-shaped portion
18 minimum diameter portion
20 ring-shaped protrusion
21 ring groove
22 non-threaded portion
30 metal plate
31 pilot hole
40 dice
50 punch
60 object to be fastened
70 nut

The invention claimed is:

1. A fastening structure is configured to fasten a thin metal plate and a thin object with a staking bolt and a nut,
   wherein the staking bolt comprises a head having a bearing face and a shank having an external thread,
   wherein the shank includes a ring-shaped protrusion formed at an upper end of the shank and a ring groove located closer to the head relative to the ring-shaped protrusion,
   wherein the head is flat and includes on its bearing face, a whirl-stop protrusion having a plurality of radially extending arms that protrude a thickness of t from the bearing face,
   wherein a minimum diameter D between respective arms of the whirl-stop protrusion is larger than an outer diameter d of the ring-shaped protrusion,
   wherein $t \times (D-d)/2$, which is a longitudinal cross-sectional area A of a minimum portion of the whirl-stop protrusion, is equal to or greater than a longitudinal cross-sectional area of the ring groove,
   wherein an outer diameter d1 of the shank at a non-threaded portion between the ring-shaped protrusion and the external thread is equal to or less than a root diameter d2 of the external thread,
   wherein the staking bolt is configured to be caulked and fixed to the thin metal plate in a state where metal material from the thin metal plate is plastically flowed in the rig groove, and
   wherein the thin object is inserted onto the shank and the nut is configured to be screwed onto the shank beyond the non-threaded portion formed between the external thread of the shank and the ring-shaped protrusion such that the nut is fastened in contact with the thin object that is inserted onto the shank.

* * * * *